J. M. AND W. C. THORPE.
CHILD'S VEHICLE.
APPLICATION FILED MAR. 17, 1920.

1,418,266.

Patented May 30, 1922.

INVENTORS.
Joseph M. Thorpe.
William C. Thorpe.
BY Chas. E. Townsend
ATTORNEY.

UNITED STATES PATENT OFFICE.

JOSEPH M. THORPE AND WILLIAM C. THORPE, OF OAKLAND, CALIFORNIA.

CHILD'S VEHICLE.

1,418,266.  Specification of Letters Patent.  Patented May 30, 1922.

Application filed March 17, 1920. Serial No. 366,555.

*To all whom it may concern:*

Be it known that we, JOSEPH M. THORPE and WILLIAM C. THORPE, citizens of the United States, residing at Oakland, in the county of Alameda and State of California, have invented new and useful Improvements in Children's Vehicles, of which the following is a specification.

This application relates to a child's vehicle.

It is the principal object of the present invention to provide a vehicle for the special use of children and which is equipped with convenient means for producing self-propulsion and for properly steering the vehicle, said power means being designed so as to permit an uninterrupted movement of the vehicle and being further designed so that the propulsion means may be disengaged while coasting or when the vehicle is to be backed.

The present invention contemplates the use of a running gear comprising a front steering wheel and a pair of rear driving wheels which carry a seat and which driving wheels may be continuously driven by the alternate oscillation of a hand lever, said driving means allowing the vehicle to proceed along its course with a continuous smooth action and permitting free movement of the running gear in either direction when the hand lever is in its extreme forward position.

The invention is illustrated by way of example in the accompanying drawings, in which.

Figure 1:
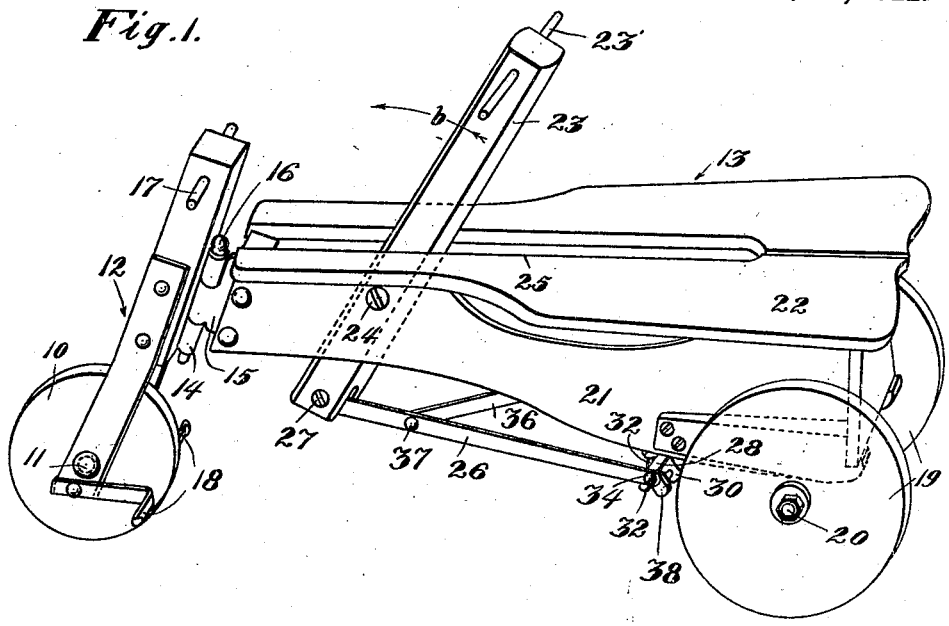
Fig. 1 is a view in perspective, disclosing the assembled vehicle.

Referring more particularly to the drawings, 10 indicates a front steering wheel mounted upon an axle 11. This axle is carried by a fork 12 which is pivotally secured to the body 13 of the vehicle by hinged members 14 and 15 and hinge pin 16. The fork extends upwardly above its crotch to provide means for carrying small handle bars 17. These handle bars may be used if desired in guiding the vehicle as well as foot rests 18 which extend forwardly below the horizontal plane of the wheel axis and are secured to the terminating ends of the fork.

Figure 2:
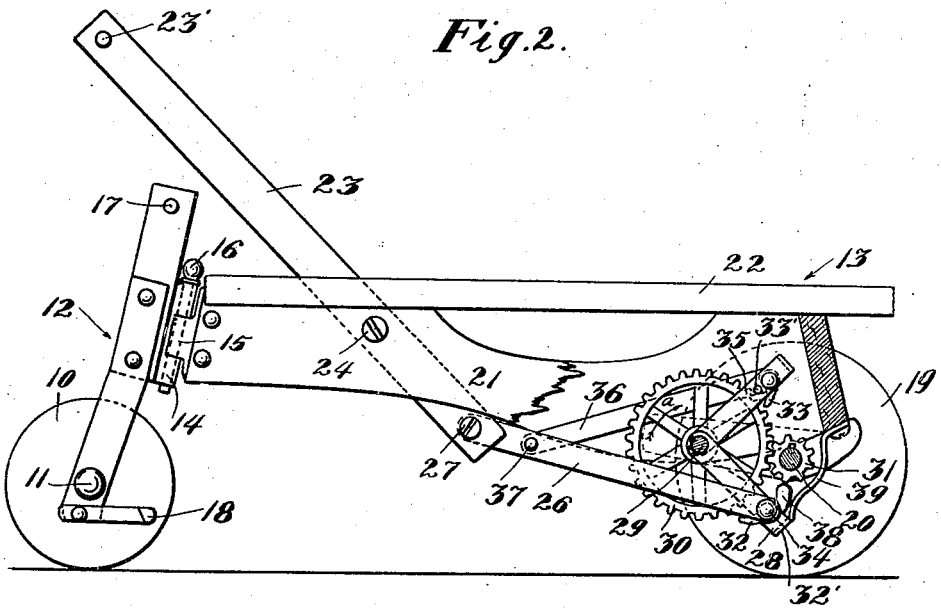
Fig. 2 is a view in vertical section and side elevation showing the vehicle and particularly disclosing the power transmission mechanism.

The rear end of the vehicle body is supported upon wheels 19. These wheels are mounted on the opposite ends of an axle 20, which axle is rotatably supported within suitable bearings beneath the vehicle body. One of the wheels is fixed to rotate with the axle and to drive the vehicle. A sub frame 21 is secured to the seat portion 22 of the vehicle body and provides a suitable mounting for the axle bearings and a guard for the hand lever 23. This lever is pivoted to the sub frame by a bolt 24 and is free to oscillate in a vertical plane through a slot 25 in the seat 22. The lower end of the lever 23 is provided with a connecting rod 26 which is pivoted to the hand lever at its forward end by a bolt 27 and is pivotally connected at its rear end to a stirrup 28. This stirrup is rotatably supported upon a transmission shaft 29 extending parallel to the axle shaft 20. The transmission shaft carries a driving gear 30 which is in constant mesh with a pinion 31 keyed to the axle. The teeth of the gear 30 also serve as ratchet teeth to be engaged by dogs 32 and 33. The dog 32 is pivotally secured upon a pin 34 by which the connecting rod 26 is secured to the stirrup 28. The dog 33 is pivoted to an upper stirrup 35 which is provided with a secondary connecting rod 36 leading forwardly and pivotably secured to a pin 37 to the main connecting rod 36. It will be noted by reference to Fig. 2 that the dogs 32 and 33 are adapted to alternately operate by gravity to engage the teeth of the gear 30 and to rotate this gear in the direction of the arrow —*a*— upon alternate oscillation of the hand lever 23.

The two dogs 32 and 33 hang from their pivots so that they will positively engage the teeth when moving in one direction and will be relieved therefrom when moving in the opposite direction. The dog 33 will naturally hang in an engaging position while the dog 32 must be provided with a counter weight 38 in the rear of its pivotal center to normally hold it up against the teeth. As the dogs are yieldably held against the gear it is possible for the gear to rotate while the dogs stand still as when the momentum is sufficient to coast the vehicle. It will thus be seen that should the counter weight be relieved it is possible to hold the dog 32 out of engagement at the same time the dog 33 remains free. This is accomplished by means of a trip finger 39 suspended from the sub frame and having a terminating end in the path of travel of the counter weight 38, thus when the hand lever is swung to its foremost position the counter weight will be forced against the trip finger and held out of engagement with the gear while permitting the vehicle to coast or to be moved backwards if desired.

When using pawls and ratchets the structures are often designed so that the complete thrust will be upon pawls and as this is objectionable the pawls in the present case are adapted to lock against fixed members which will cause the strain to be thrown upon said members rather than the pawls and their pivots. By reference to Fig. 2 it will be seen that the pawls are of a radial length such as to cause them to stand in radial alignment with the gear 30 when operating, the upper pawl resting against a stop pin 33' and the lower pawl resting against a stop shoulder 32'. This will relieve the strain upon the members and will prevent undue binding and wear of the gear and pawls.

In operation of the present invention, the vehicle is assembled as shown in the drawings and a person may then occupy the seat 22, the feet of the occupant may rest upon the foot rests 18 by which the front wheel may be guided or if desired may rest upon the handle bars 17. In this connection attention is particularly directed to the forward inclination of the lower end of fork 12 and the disposition of the extensions of foot rest 18 a distance ahead of the point of contact between the wheel and the ground and also a considerable distance ahead of the pivotal axis of the fork. This provides a steering action considerably the same as obtained by a castor construction and insures that the wheel may be easily turned in a manner to guide the vehicle. Handle bars 23' may be grasped and an oscillating movement of the hand lever 23 produced. Assuming that this movement is first in the direction of the arrow —b— as indicated in Fig. 1, it will be seen that the lower end of the hand lever will swing rearwardly and force both connecting rods 26 and 36 rearwardly. This will act to swing the upper stirrups 35 rearwardly and downwardly and at the same time swing the lower stirrup 28 rearwardly and upwardly. Gravity action of the dog 33 will cause it to engage one of the teeth of gear 30 and to lock against pin 33' thus rotating this gear in the direction of the arrow —a—. A return stroke of the hand lever will draw both of the stirrups forwardly and while the dog 33 is inoperative the counter weight 38 of dog 32 will cause this dog to swing upwardly and engage one of the teeth on the lower side of the gear, at the same time drawing the counter weight against a shoulder 32'. A further movement of the hand lever will cause the dog and gear to move in unison and continue the rotation of the gear in the direction of the arrow —a—. In the event that it is desired to permit the vehicle to be backed without operation of the driving gear the hand lever is swung forwardly to its extreme position and the counter weight 38 caused to strike the end of trip finger 39. This will hold the lower stroke out of engagement with the gear 30 while allowing the upper dog to swing free. The gear 30 will thus rotate freely with simultaneous rotation of the pinion 31, and may be power driven whenever the hand lever is drawn rearwardly to relieve the counter weight from the finger and to permit the member 32 to engage the teeth. The vehicle will coast at all times and when desired the hand lever be held stationary without retarding the movement of the gears.

It will thus be seen that the vehicle here disclosed may be easily guided and may be conveniently propelled by the occupant thereof while permitting it to coast without operation of the hand lever whenever desired.

While we have shown the preferred form of our invention as now known to us it will be understood that various changes in the combination, construction and arrangement of parts may be made by those skilled in the art without departing from the spirit of the invention as claimed.

Having thus described our invention, what we claim and desire to secure by Letters Patent, is:

1. In a vehicle drive of the character described, a shaft, a gear mounted thereon having exterior spur teeth formed around its periphery, a pair of arms adapted to swing about the shaft, means for transmitting a unitary oscillating movement to the arms in opposition to each other, and a pawl pivotally mounted on the outer end of each arm and engageable with the exterior spur teeth of the gear, a driving shaft and a spur pinion secured on said shaft and intermeshing with the first named spur gear.

2. A child's vehicle comprising a body, a rear axle therefor having wheels at the opposite ends thereof, one of which is fixed thereto, a fork at the forward end of the body carrying a steering wheel, a pivotal connection between said fork and the forward end of the body whereby the vehicle may be guided, a power mechanism for driving the rear axle, an oscillating hand lever, and means whereby alternate oscillation of said hand lever will produce continuous rotation of the rear axle, and means whereby movement of the hand lever to an extreme position will release the driving mechanism and permit free rotation of the rear axle in either direction.

3. In a vehicle drive of the character described a shaft, a gear mounted thereon having exterior spur teeth formed around its periphery, a pair of arms adapted to swing about the shaft, means for transmitting a unitary oscillating movement to the arms in opposition to each other, a pawl pivotally mounted on the outer end of each arm and engageable with the spur teeth, and means whereby the pawls may be rendered inoperative to permit free turning movement of the gear in either direction.

4. A child's vehicle comprising a seat board, a sub-frame there beneath, a freely rotating axle supported under the rear thereof and carrying wheels, one being fixed thereto, an oscillating lever extending through the seat board, a transmission shaft parallel to the rear axle, a pair of arms free to swing on said shaft and carrying pivoted pawls at their outer ends, a single gear having spur teeth formed around its exterior surface and secured to said transmission shaft, the teeth of which are adapted to be engaged by the pawls, a pinion fixed to the rear axle and in constant mesh with transmission shafts, and a connection between the arms and the oscillating lever whereby the arms may be swung in unison and in opposition to each other to alternately cause engagement of the pawls with the gear teeth and to provide a continuous rotation of the gear.

5. A child's vehicle comprising a seat board, a sub-frame therebeneath, a free rotating axle supported under the rear thereof and carrying driving wheels, an oscillating lever extending through the seat board, a transmission shaft parallel to the rear axle, a pair of arms free to swing on the transmission shaft and carrying pivotally mounted pawls at their outer ends, a single gear secured to the transmission shaft, the teeth of which are adapted to be engaged by the pawls, a pinion fixed to the rear axle and in constant mesh with said gear, a driving connection between the oscillating lever and the arms whereby the arms are oscillated in unison but in opposition to each other to produce alternate engagement of the pawls with the gear teeth, and to provide a continuous rotation of the gear, and trip means engageable with one of the pawls to maintain the same out of engagement with the gear, the pawl on the other arm being held out of engaging position by swinging away from the gear when the trip means is engaged.

6. In combination with an oscillating hand lever, a power transmitting mechanism comprising a transmission shaft, a gear freely rotatable thereon and having teeth formed on its exterior surface only, a pair of swinging arms pivoted upon said transmission shaft, a pawl pivoted on the exterior end of each arm and gravity actuated to engage the teeth of the gear and to turn it in a single direction upon alternate oscillations of the hand lever, and a stop member on each arm which the pawls engage and by which they are supported when engagement is made with the teeth.

7. In a vehicle drive of the character described the combination with the driving gear and the oscillating arms cooperating therewith, of means for transmitting an oscillating movement to said arms in unison and in opposition to each other, said means adapted to swing the arms to an extreme position, and a pawl pivotally mounted on the outer end of each arm and normally engageable with the teeth of the gear, but adapted to be automatically swung out of engagement with the teeth of the gear when the extreme position is assumed.

8. In a vehicle drive of the character described the combination with the driving gear and the oscillating arms cooperating therewith, of means for transmitting an oscillating movement to said arms in unison and in opposition to each other, said means adapted to swing the arms to an extreme position, a pawl pivotally mounted on the outer end of each arm and normally engageable with the teeth of the gear, a stop member engageable with one of the pawls when the extreme position is assumed, to hold the pawl out of engagement with the teeth, the pawl on the opposite arm adapted to swing by gravity out of engagement with the teeth when the extreme position is assumed.

In testimony whereof we have hereunto set our hands in the presence of two subscribing witnesses.

JOSEPH M. THORPE.
WILLIAM C. THORPE.

Witnesses:
 SADIE L. THORPE,
 MARGARET J. THORPE.